United States Patent
Patterson et al.

(10) Patent No.: US 6,761,570 B2
(45) Date of Patent: Jul. 13, 2004

(54) ELECTRICAL CONNECTOR WITH SHUNT FOR HOT MATING AND UNMATING

(75) Inventors: Jeremy C. Patterson, McLeansville, NC (US); Lyle S. Bryan, Winston-Salem, NC (US); John Cowan, Winston-Salem, NC (US)

(73) Assignee: Tyco Electronics Corporation, Middletown, PA (US)

( * ) Notice: Subject to any disclaimer, the term of this patent is extended or adjusted under 35 U.S.C. 154(b) by 36 days.

(21) Appl. No.: 10/167,514

(22) Filed: Jun. 12, 2002

(65) Prior Publication Data

US 2003/0036299 A1 Feb. 20, 2003

Related U.S. Application Data

(60) Provisional application No. 60/312,291, filed on Aug. 14, 2001.

(51) Int. Cl.[7] .............................................. H01R 29/00
(52) U.S. Cl. ...................................... 439/188; 200/51.1
(58) Field of Search ................................ 439/188, 513, 439/862; 200/51.1, 51 R

(56) References Cited

U.S. PATENT DOCUMENTS

| | | | | |
|---|---|---|---|---|
| 4,633,048 A | * | 12/1986 | Komatsu | 200/51.1 |
| 4,786,258 A | * | 11/1988 | Shaffer et al. | 439/188 |
| 5,631,504 A | * | 5/1997 | Adahan | 307/72 |
| 5,893,767 A | * | 4/1999 | Broschard, III | 439/188 |
| 6,106,315 A | * | 8/2000 | Lalange et al. | 439/188 |
| 6,135,828 A | * | 10/2000 | Lalange et al. | 439/862 |
| 6,198,642 B1 | * | 3/2001 | Kociecki et al. | 363/37 |

* cited by examiner

Primary Examiner—Alexander Gilman

(57) ABSTRACT

A connector assembly (2) includes and arc prevention shunt (20) in one of two mating electrical connectors (10, 30). The shunt (20) engages a terminal (34) when the connectors (10) and (20) are in a partially mated configuration. If the terminal (34) is hot, current will pass from the shunt (20) to a relay coil (62) to close contacts (64) in a Form C relay (60). When the normally open switch contacts (64) are closed a bypass circuit (52) disconnects the terminals (14, 34) in the connectors (10, 30) so arcing will not occur when the connectors (10, 30) are mated or unmated under load. When the connectors (10, 30) are in the fully mated or fully unmated, the shunt (20) is electrically isolated from the terminals (14, 34).

20 Claims, 2 Drawing Sheets

ELECTRICAL CONNECTOR WITH SHUNT FOR HOT MATING AND UNMATING

This application claims the benefit of provisional application No. 60/312,291 filed on Aug. 14, 2001.

BACKGROUND OF THE INVENTION

1. Field of the Invention

This invention is related to electrical connectors of the type that can be mated and unmated. This invention is also related to the prevention of arcing between mating terminals as electrical connectors are mated or unmated in a hot condition. This invention is also related to the use of a shunt to provide a signal to close a relay to bypass current around the electrical connectors during mating and unmating to reduce the chance of arcing.

2. Description of the Prior Art

Arcing can be a problem when electrical connectors are mated and unmated under load or in a hot condition. If arcing between mating electrical terminals does occur, it would normally occur when the terminals are initially mated or unmated and the terminals are either not in contact or have not been brought into sufficient contact to carry the current The replacement of a 14 volt system with a 42 volt electrical architecture for automobiles increases the chance that an arc can form if electrical connectors are mated and unmated under load. However, it would be rather expensive to adopt systems for arc avoidance, prevention or suppression that are commonly used for systems with a higher voltage or more current carrying capacity. Applicants are not aware of a simple, existing, inexpensive system using terminals of substantially the same type as are used in current automotive electrical systems and introducing a minimum amount of additional leads or wires. The addition of sacrificial pins that make first and break last to avoid arcing for shorter contact in the same current path requires new terminals and new connectors and increases the contact density.

Shunts have been used to common adjacent contacts in the same connector when unmated from a mating connector. For example, shunts of this type are commonly used in air bag connector. However, applicants are unaware of the use of a single shunt in one of two mating connectors to provide a signal to a relay to bypass current around the electrical connector before mating terminals are in a position where they would be susceptible to arcing.

SUMMARY OF THE INVENTION

The instant invention employs a single shunt to provide a signal for bypassing an electrical connector assembly before the mating terminals have reached a position in which arcing can occur between two terminals. Only a single shunt and a single lead needs to be added to an electrical connector. This reduces the number of leads that would be needed for a make first, break last sacrificial contact. Furthermore the single lead can be connected to a switch, such as a Form C relay, that can be used in the electrical system of an automobile. The relay can be connected to a circuit path that bypasses the electrical connector assembly when a signal is received through the shunt to close the Form C relay.

In a preferred embodiment, the relay is a solid state relay device such as that disclosed in U.S. Pat. No. 5,926,354 or, most preferably, that disclosed in U.S. patent application Ser. No. 10/068,925, filed Feb. 8, 2002. These references disclose solid state relays including a power metal oxide semiconductor field effect transducer ("MOSFE"). In the latter reference, the circuitry of the relay floats when the power MOSFET is commanded OFF to prevent leakage currents from draining a battery. The disclosures of these references are incorporated herein by reference in their entirety.

DETAILED DESCRIPTION OF THE PREFERRED EMBODIMENT

Figure 1:
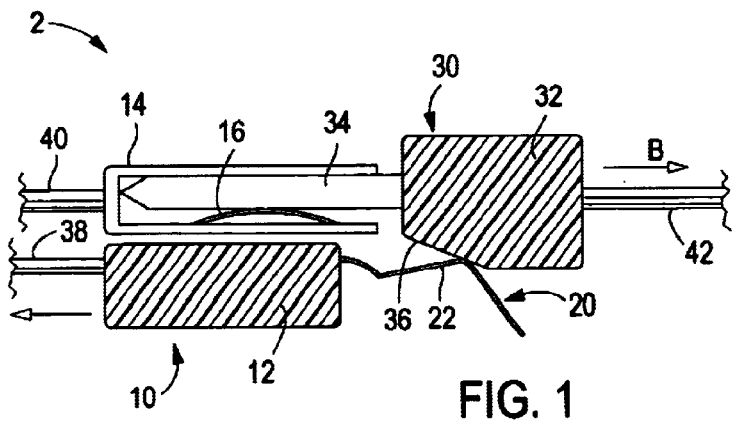
FIG. 1 is diagrammatic view of an electrical connector assembly showing two fully mated electrical connectors with a shunt in one connector held in a deflected position by engagement with a surface on the other electrical connector.
Figure 2:
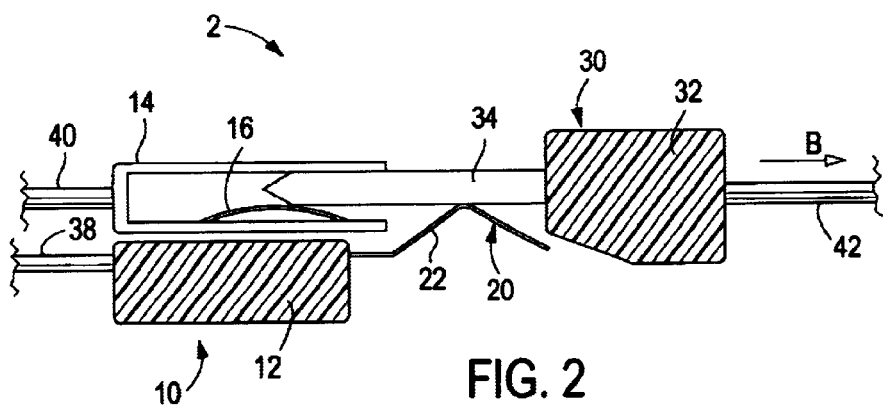
FIG. 2 is a diagrammatic view of a partially mated electrical connector assembly in which the shunt is in contact with a terminal in the other electrical connector. Mating terminals are still in contact and the terminals are approaching a position in which arcing might occur.
Figure 3:
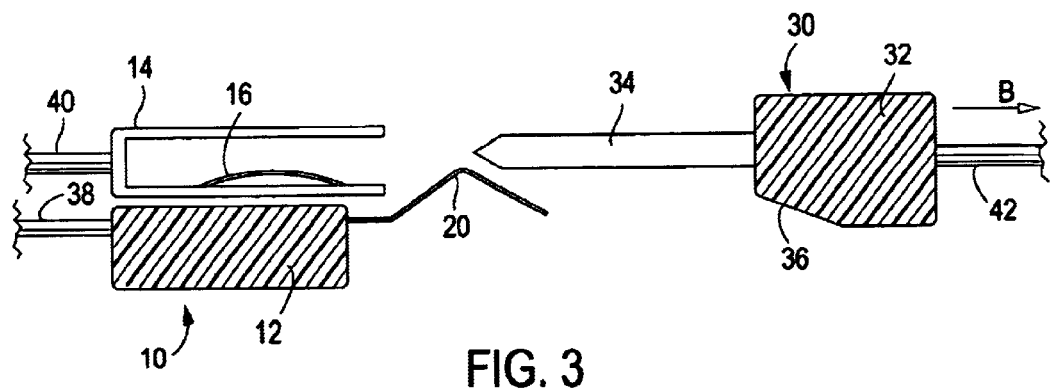
FIG. 3 is a diagrammatic view of the two electrical connectors in an unmated configuration in which the shunt is in an undeflected configuration.

FIGS. 1–3 are diagrammatic views that illustrate the use of a shunt 20 in an electrical connector assembly 2 employing two electrical connectors 10, 30. One connector 10 has female or receptacle terminals 14 and the other connector 30 has male terminals 34, such as pins or blades. Only a single mating pair of terminals 14, 34 is shown in FIGS. 1–3, but it should be understood that each connector 10, 30 can contain a plurality of terminals 14, 34.

Figure 4:
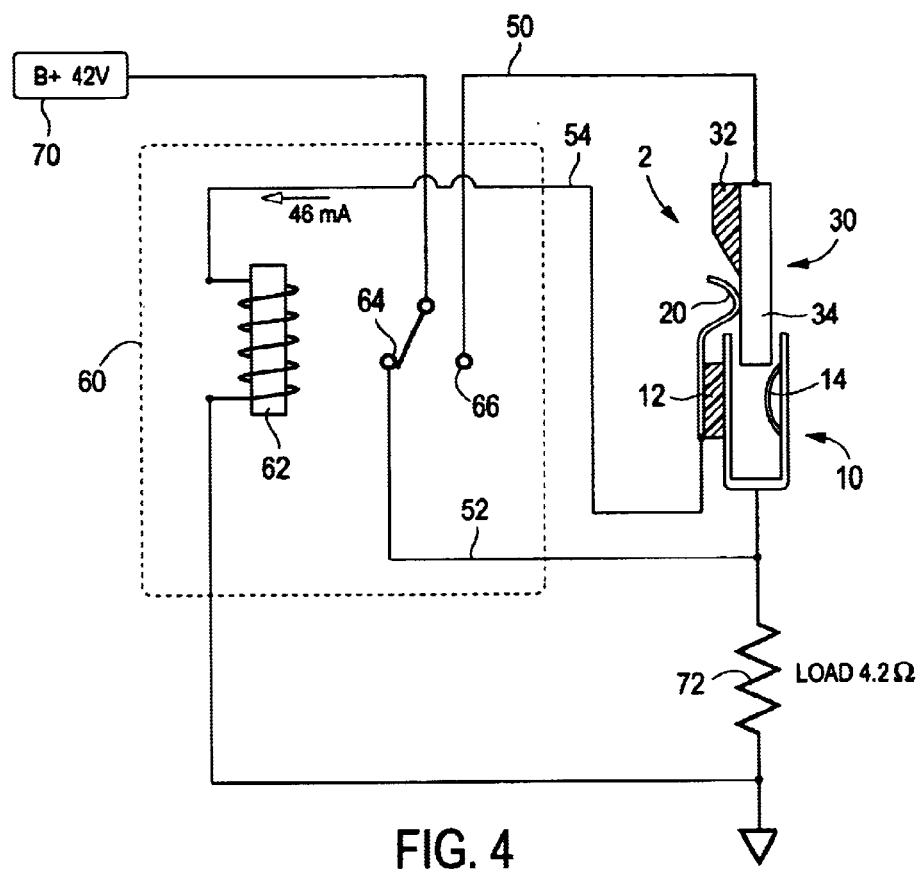
FIG. 4 is a diagrammatic view of a circuit in which a Form C relay has been closed to bypass current around an electrical connector assembly before arcing can occur.

In the fully mated configuration of FIG. 1, the male terminal 34 is mated with the female terminal 14. Each terminal 14, 34 is mounted in a connector housing 12, 32, which is illustrated in these diagrammatic views by plastic blocks. In this diagrammatic view, both the female and the male terminals 14, 34 are connected to wires 40, 42, which form a circuit path 50, as shown in FIG. 4. It should be understood that either or both of these connectors 10, 30 could be a printed circuit board connector.

The shunt 20 is also terminated to an external conductor or wire 38. In the fully mated configuration of FIG. 1, the shunt 20 is held in a deflected position in which the shunt 20 is electrically isolated from both the male terminal 34 and the female terminal 14. In the schematic view of FIG. 1, the shunt 20 engages an inclined ramp or camming surface 36 on the connector housing 32 containing a male terminal or pin 34. This camming surface 36 is located on the front of the connector housing 32 and slopes away from the male terminal 34, so that it deflects the shunt 20 outwardly, away from the male terminal 34. Typically the two connectors 10,30 would be held in the fully mated configuration by conventional connector latches, which do not form an essential element of this invention and are therefore not shown. It should also be understood that other equivalent means could be used to deflect, move or shift the shunt 20 into a disengaged position. For example the shunt could be part of a subassembly that is in turn included as a part of the connector housing containing the female terminals. Relative motion between a subassembly containing the shunt and the remainder of the electrical connector could result in deflection of the shunt to a disengaged position. Any number of means could be employed to shift the shunt to a disengaged position.

FIG. 2 is a schematic showing the two connectors 10, 30 in a partially mated configuration in which the leading edge of the male terminal 34 is just engaging a spring 16 in the female terminal 14. Depending on the degree of contact in this partially mated configuration, this schematic view could represent a position in which arcing could occur between the male terminal 34 and the female terminal 14 in the absence of any means for arc prevention or arc suppression. Even if contact between the two terminals 14,34 is sufficient to prevent formation of an arc, continued unmating of the two electrical connectors 10, 30 will eventually bring the terminals 14, 34 into an arc susceptible position.

In the partially mated configuration of FIG. 2, the shunt 20 has moved from a deflected or disengaged position to a position in which the shunt 20 in the first connector 10 is engaging the male terminals 34 in the second connector 30. If the male terminal 34 is under load or is in a hot condition, the shunt 20 will then be brought to substantially the same voltage level as the male terminal 34, which it contacts. Since the shunt 20 is attached to an external conductor 38, a signal can be transmitted when the shunt 20 engages the male terminal 34 in the partially mated configuration of FIG. 2.

FIG. 3 is a schematic of the two connectors 10, 30 in a disengaged or unmated configuration. The male terminal 34 has been completely disengaged from the female terminal 14 to open the circuit path 50 (FIG. 4) formerly established by mating the two electrical connectors 10, 30. FIG. 3 also shows that the shunt 20 is disengaged from the male terminal 34. In this representative embodiment, the shunt 20 has returned to a disengaged position. As shown in FIG. 3 the shunt 20 now extends in front of the mating end 18 of the female terminal 14 and into the path traversed by the male terminal 34 during mating and unmating. In this position the shunt 20 is electrically isolated from both terminals 14, 34.

FIGS. 1–3 show the relative positions of the shunt 20 first in the fully mated configuration, then in the partially mated configuration and then in the fully unmated configuration. Since arcing is generally more critical during unmating under load than during mating, this sequence shows the positions of the shunt 20 in relation to the two terminals 14, 34 in the more critical of the sequences in which arcing might occur. Of course the shunt 20 would function in the same way when the two connectors 10, 30 are mated. As shown in FIG. 3, the shunt 20 is in the path of the male terminal 34, which must engage the shunt 20 before it engages the receptacle terminal 34. Thus the shunt 20 is energized before the receptacle terminal 14, when the male terminal 34 is at a relatively higher potential. This voltage rise on the shunt 20 provides a signal or provides the means for closing a Form C relay 60, as will be discussed with reference to FIG. 4.

Although the shunt 20 engages the male terminal 34 in the embodiment illustrated in FIGS. 1–3, it should be understood that the positions of the male and female terminals 34, 14 could be reversed relative to the shunt 20. In the circuit of FIG. 4, it will only be necessary for the shunt 20 to engage the terminal 34 that is at a different potential when the two connectors 10, 30 are unmated under load. It is also not necessary for the shunt 20 to engage a terminal in the opposite connector. For example, it would be possible for the shunt to engage the terminal in the same connector in the partially mated configuration, and still be isolated from the terminal in the same connector when unmated. This could be accomplished by employing a camming projection in the opposite connector, which engages the shunt so as to deflect it into the engaged position only when the connectors are in the partially mated configuration. For example a bump on the opposite connector could engage a protrusion on the shunt during a portion of the travel of the two connectors during mating and unmating. Other similar configuration could be employed to bias the shunt into contact with the appropriate terminal in the partially mated configuration.

The circuit in which the connector assembly 2 is used is shown in FIG. 4. In FIG. 4, the connector assembly 2 is in the partially mated configuration with the shunt 20 engaging contact or terminal 34. The diagram of FIG. 4 shows how a shunt mechanism 20 could be used to divert power away form contacts 14,34 if the shunt 20 is attached to a relay coil 62. When the shunt 20 is in contact with the male terminal or blade 34, the relay 60 will be in the open position as shown in FIG. 4, and the power will be diverted from the contacts or terminals 14, 34 through bypass circuit 52. With power diverted away from the contacts 14,34, the connector assembly 2 can mate and unmate with no load and therefore no arc.

The circuit shown in FIG. 4 is intended to be used in a 42 volt automotive electrical system with the male terminal 34 being connected to a 42 volt voltage source 70. The receptacle terminal 14 in the other connector 10 is connected to a 4.2 Ω load 72, which is in turn connected to ground. A Form C relay 60 is connected to a bypass circuit path 52. Normally relay switch contact 66 is closed and current flows from the source through the mated connector assembly 2 to the load. However, when switch contact 64 is momentarily closed, current flows through the bypass circuit 52 and not through the connector assembly 2. In the preferred embodiment, a Form C mini or micro 280 relay is used.

When the connector assembly is in the fully mated configuration or when it is completely disconnected the switch contact 66 is closed. It is only when the shunt 20 engages the pin 34 that the relay coil 62 is energized to momentarily close the switch contact 64 to bypass current around the connector assembly 2. In the embodiment depicted in FIG. 4 the relay coil 62 is a 42 volt relay with a coil resistance of approximately 900 Ω. The relay coil 62 is connected in a separate circuit path 54 to the shunt 20 and to ground. When the shunt 20 contacts the male terminal 34, which is at 42 volts, a current of 42 mA flows in the coil circuit path 54. Since the shunt 20 only contacts the male terminal 34, when the connector assembly 2 is in the partially mated configuration of FIG. 2, the relay coil 62 will only be energized when the connector assembly 2 is in the partially mated configuration. In this configuration, the switch contact 64 is closed and current is diverted along the bypass circuit path 52 so that no current flows through the connector assembly 2. Since the switch contact 64 is closed before the two terminals 14, 34 reach an arc susceptible position, the two terminals 14, 34 will be at the same potential when disconnected, or initially connected, so no potential difference will exist and no arcing can occur. Mating and unmating of the two connectors 10, 30 thus always occurs in a no load condition. It has been found that at normal mating and unmating speeds, the switch contact 64 will not open before the two terminals 14, 34 are either fully unmated or fully mated, or in other words until the terminals 14, 24 are no longer in an arc susceptible position.

Although only a single pair of terminals or contacts 14, 34 is shown in the schematics of FIGS. 1–4, it should be understood that multiple pairs of terminals in the same mating connectors can be disconnected to avoid arcing by using only a single shunt. Since the shunt 20 provides a signal or a current to energize the relay coil 62, all of the arc susceptible terminal pairs can be wired through a switch or switches in this manner with one shunt being used to activate one or more relay coils. It should also be understood that the shunt 20 need not be connected to a relay 60, but could be used to provide a signal to other conventional power switching devices in a manner that would be apparent to one of ordinary skill in the art.

Figure 5:
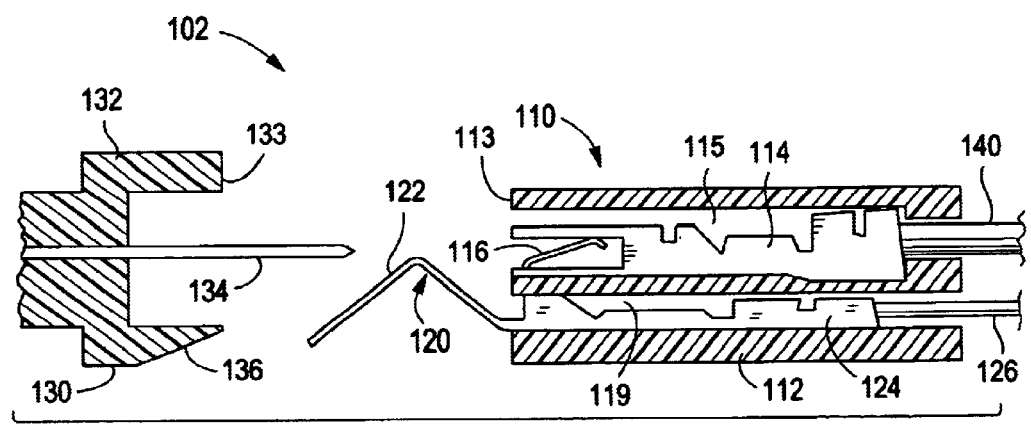
FIG. 5 is a sectional view of a representative embodiment of mating electrical connectors incorporating the instant invention.

FIG. 5 shows a typical connector assembly 102 with which this invention could be employed. This connector assembly 102 includes a printed circuit board header 130 with one terminal pin 134 mounted in an insulative housing 132. Each pin 134 in the header 130 is normally connected to a conventional conductor trace on a printed circuit board, not shown. This printed circuit board header 130 is typical of standard printed circuit board headers that are commonly used in automotive applications. However, the header housing 132 has an inclined camming surface 136 located adjacent a mating end 133 of the header 130. This inclined surface 136 slopes away from the center of the header 130, and is positioned to deflect the shunt 120 in the plug connector 110 that mates with the printed circuit board header 130.

The plug connector 110 includes at least one receptacle or female terminal or contact 114 that is matable to one of the pins 134 in the header 130. It should be understood that multiple pins and receptacle contact or terminals could be present in this connector assembly 102. Each receptacle terminal 114 is positioned within a terminal cavity 115 in the molded plug housing 112, and can be crimped to an external wire 140. A spring beam 116 on the mating end 118 of the receptacle contacts 114 will engage the corresponding pin 134 when the two connectors 110, 130 are fully mated.

The shunt 120 is located in a separate shunt housing cavity 119 and is terminated to a lead 126 by using a conventional wire crimp 124. A deflectable contact section 122 of the shunt 120 extends beyond the front face 113 of the plug housing 112 and in front of the mating end 118 of the receptacle terminal 112. In this position the pin 134 will engage the shunt 120 before engaging the receptacle contact 114, and will be in contact with the shunt 120 as the connectors 110, 130 are unmated and the terminals 114, 124 are in an arc susceptible position. Only when the deflectable spring section 122 of the shunt 120 engages the slanted camming surface 136 on the header housing 132 will the shunt 120 be outwardly deflected out of contact with an adjacent pin 134. The shunt 120 will engage the camming surface 136 only when the male contact 134 is sufficiently in contact with the receptacle terminal 114 so that arcing is no longer possible between the two mating terminals 114, 134 It should be understood that the configuration of FIG. 5 is only intended to show one possible example of the types of terminals or connectors and the configurations in which this arc suppression shunt assembly can be employed. For example, one alternative embodiment could employ a shroud surrounding the pins in the header. Alternatively the plug connector housing could extend to protect the deflectable shunt, or in other words the shunt could be recessed in the plug connector housing. Therefore the invention described herein is not limited to the representative embodiments, but is instead defined by the following claims.

We claim:

1. A circuit comprising an electrical connector assembly and a switch, wherein:
    the electrical connector assembly includes first and second matable electrical connectors, each connector including at least one terminal mounted in a housing, the first connector also including a shunt, the shunt being maintained in an open position when the two connectors are fully mated, the shunt being movable to close a first circuit path including the terminal in the second connector as the two connectors are unmated, before the terminal in the second connector is disengaged from a mating terminal in the first connector; and wherein,
    the shunt is connected to a relay when the shunt closes the first circuit path including the terminal in the second connector; and wherein,
    the relay is connected to a second circuit path, which bypasses the electrical connector assembly, so that current is switched to bypass the electrical connector assembly before the terminals in the two connectors are completely unmated so that arcing between the two terminals is eliminated as the connectors are unmated.

2. The circuit of claim 1 wherein the shunt engages the housing of the second connector to hold the shunt in an open position when the two connectors are fully mated.

3. The circuit of claim 1 wherein the shunt contacts the terminal in the second connector during unmating of the two connectors to close the first circuit path including the terminal in the second connector.

4. The circuit of claim 1 wherein the two mating terminals are connected between a 42 volt source and ground.

5. The circuit of claim 4 wherein a load is connected between the two mating terminals and ground.

6. The circuit of claim 1 wherein the shunt comprises a deflectable spring.

7. The circuit of claim 6 wherein the terminal in the second connector comprise a male terminal.

8. The circuit of claim 6 wherein the second connector includes an inclined surface for displacing the shunt from a closed position, engaging the terminal in the second connector, to the open position, engaging the housing of the second connector.

9. The circuit of claim 1 wherein the first and second connectors include a plurality of mating terminals.

10. The circuit of claim 9 wherein the second circuit path bypasses a plurality of mating terminals in the two connectors as a single shunt closes the first circuit path including a single terminal and a device for closing a switch operatively connected to said relay.

11. The circuit of claim 1 wherein the first circuit path includes a relay coil.

12. The circuit of claim 11 wherein the relay comprises a 42 volt relay.

13. An electrical connector assembly comprising a first electrical connector and a second electrical connector, each electrical connector including a terminal matable with a terminal in the other connector, the first connector containing a single shunt engagable with the terminal in the second electrical connector during mating and unmating of the two electrical connectors, the shunt being deflectable out of engagement with the terminal in the second electrical connector when the two electrical connectors are fully mated, the shunt including means for attaching the shunt to an external lead to provide a signal when the shunt is in contact with the terminal in the second electrical connector, the shunt being in engagement with the terminal in the second electrical connector before the terminals are mated or unmated so that arcing does not occur between the mating terminals during mating and unmating of the electrical connectors.

14. The assembly of claim 13 wherein the shunt is connected to a relay coil.

15. An electrical connector assembly comprising a first electrical connector and a mating second electrical connector, wherein:

the first electrical connector includes at least one terminal and at least one deflectable shunt, the shunt extending beyond the terminal on a mating face of the first electrical connector with the shunt being electrically isolated from the terminal, the shunt extending in front of the terminal in an undeflected position and being laterally displaced relative to the terminal in a deflected position; and wherein the second electrical connector includes a mating terminal matable with the at least one terminal in the first electrical connector and a camming surface engagable with the shunt when the first and second electrical connectors are mated to move the shunt to the deflected position; and wherein the shunt is engagable with the mating terminal in the second electrical connector only when the first and second electrical connectors are partially mated, the deflectable shunt sufficiently clearing the camming surface during unmating of the first and second electrical connectors prior to the time that an arc can develop between the at least one terminal in the first electrical connector and the mating terminal in the second electrical connector.

16. The electrical connector assembly of claim 15 wherein the at least one terminal in the first electrical connector comprises a female terminal and the mating terminal in the second electrical connector comprises a male terminal.

17. The electrical connector assembly of claim 15 wherein the deflectable shunt includes means for connecting the shunt to an external lead.

18. The electrical connector assembly of claim 15 wherein a plurality of terminals are positioned in the first electrical connector, and the first electrical connector has only a single deflectable shunt engagable with a single mating terminal.

19. The electrical connector assembly of claim 15 wherein the shunt comprises a spring member.

20. The electrical connector assembly of claim 15 wherein the camming surface comprises an inclined surface, with the mating terminal extending beyond the inclined surface toward a mating face of the second electrical connector.

* * * * *